(12) United States Patent  (10) Patent No.: US 8,594,973 B2
Lee  (45) Date of Patent: Nov. 26, 2013

(54) LONGITUDE/LATITUDE TEN-DIMENSION XYZ DIGITAL-DISPLAYING SPECTROMETER

(75) Inventor: Chiu-San Lee, New Taipei (TW)

(73) Assignee: XYZ Science Co., Ltd., New Taipei (TW)

( * ) Notice: Subject to any disclaimer, the term of this patent is extended or adjusted under 35 U.S.C. 154(b) by 370 days.

(21) Appl. No.: 13/159,428

(22) Filed: Jun. 14, 2011

(65) Prior Publication Data

US 2012/0323525 A1    Dec. 20, 2012

(51) Int. Cl.
*G06F 15/00*    (2006.01)
(52) U.S. Cl.
USPC ............... 702/152; 702/182; 703/1; 703/7; 73/170.27; 126/621; 126/623
(58) Field of Classification Search
USPC ............... 702/152, 182; 703/1, 7; 73/170.27; 126/621, 623
See application file for complete search history.

(56) References Cited

U.S. PATENT DOCUMENTS

| | | | | |
|---|---|---|---|---|
| 7,832,267 | B2 * | 11/2010 | Woro | 73/170.27 |
| 8,296,114 | B2 * | 10/2012 | Prasad et al. | 703/10 |
| 2005/0283494 | A1 * | 12/2005 | Colossi et al. | 707/102 |
| 2009/0125275 | A1 * | 5/2009 | Woro | 702/182 |
| 2010/0030527 | A1 * | 2/2010 | Prasad et al. | 703/1 |
| 2011/0043515 | A1 * | 2/2011 | Stathis | 345/419 |

* cited by examiner

*Primary Examiner* — Carol S Tsai
(74) *Attorney, Agent, or Firm* — Leong C. Lei

(57) ABSTRACT

A longitude/latitude ten-dimension XYZ digital-displaying spectrometer includes an imaging device combined with the digital-displaying spectrometer to work with a Z axis position processing unit and a coordinate processing unit and arranged in information connection with a plurality of displaying elements to allow of calculation of Z0° in horizontal of East, West, South, North, and the circumference with respect to the horizontal level of the compass through the combination of the imaging device with the processing units and displaying of the angles through the displaying elements, so as to provide an improvement of precise reading of the angles in the ten dimensions.

11 Claims, 15 Drawing Sheets

LONGITUDE/LATITUDE TEN-DIMENSION XYZ DIGITAL-DISPLAYING SPECTROMETER

(a) TECHNICAL FIELD OF THE INVENTION

The present invention generally relates to an XYZ digital-displaying spectrometer, and more particularly to a longitude/latitude ten-dimension digital-displaying spectrometer that can be directly mounted to an object-to-be-detected to detect XYZ axis reference parameters including vertical, horizontal, and angles and to perform correction so as to simplify the operation and eliminate undesired limitations.

(b) DESCRIPTION OF THE PRIOR ART

Measurement techniques are commonly used in civil engineering. An example is correctly positioning an object on the horizontal, such as a door panel or other objects. Such a measurement is often done with a plumb-bob suspended by a string to identify a vertical reference line or is done with a bubble level or a water-filled flexible clear tube to identify a horizontal level. However, such measurements are often subjected to undesired limitations in measuring an angular reference line or an angular surface that is even harder to measure. Although there are some effective measurement instruments available in the market, yet the use of such instruments is not commonly accepted or recognized. Further, such instruments may lead to loss of focus point due to visual observation and incorrectness simply caused by human errors or the operator being not skilled, and consequently, for example, the door panel may not be tightly closed and other tools, such as a plane, must be used to re-shape the door panel and door case to realize close engagement between the door panel and the door case. Other measuring techniques are also available for common use, such as chalk line and chalk box. These techniques are only useful for localized measurement. Although assisting accessories are also available, yet the measured focus point obtained with such existing instruments is not commonly accepted or recognized. Certain measuring instruments, such as theodolites, photographing instruments, distance measuring devices, altitude measuring device, levels of special use, such military use or high precision machining, are only functional for identifying a horizontal reference. Although vertical references may be provided by these instruments/devices, yet the measurement result is only user-dependent, making it hard to be commonly accepted.

SUMMARY OF THE INVENTION

Thus, in view of such problems, the present invention aims to provide a longitude/latitude ten-dimension digital-displaying spectrometer that can be directly mounted to an object-to-be-detected to detect XYZ axis reference parameters including vertical, horizontal, and angles and to perform correction so as to simplify the operation and eliminate undesired limitations.

The primary objective of the present invention is realize precise calculation and displaying of horizontal level for a compass mechanism through the use of an imaging device and displaying elements mounted to a frame that cooperate with a coordinate processing unit and a Z axis position processing unit and an integrated data displaying element, so as to realize precise reading of angles in ten dimensions.

To achieve the above objective, the present invention provides a digital-displaying spectrometer, which structurally comprises an imaging device mounted at a predetermined location of the digital-displaying spectrometer and a base. The base comprises a frame mounted thereon. A plurality of displaying elements is provided at a side wall at a joint between the base and the frame for observing planar factor of (X0°, −X0°) of the X axis and (Y0°, −Y0°) of the Y axis. The opposite sides of the YY axis direction of the base are pivotally coupled to first positioning bearings at the opposite sides of the YY axis direction of the circular ring. Each of the opposite sides of the XX axis direction of the circular ring forms a first positioning hole and the first positioning hole is pivotally coupled to a second positioning bearing formed in each of the opposite sides of the XX axis direction of a casing having a first plummet and a second positioning hole is formed at each of the opposite sides of the YY axis direction thereof. The second positioning hole is pivotally coupled to a third positioning bearing on the YY axis direction of the compass mechanism. The compass mechanism comprises a light beam emitting element and a second plummet. The light beam emitting element is in information connection with a Z axis position processing unit and a coordinate processing unit. The coordinate processing unit is in information connection with the displaying elements. The Z axis position processing unit and the coordinate processing unit are in formation connection with an integrated data displaying element. As such, when the base is positioned on an object-to-be-detected, due to the gravity and above described structural arrangement, the first plummet and the second plummet causes free oscillation of the compass mechanism to eventually become standstill as being set on a horizontal reference plane. As such, when the compass reaches a horizontal condition for ten dimensions of omni-direction, the light beam emitting element then emits a light beam in a vertical direction and the imaging device picks up an image of the light beam to work with the coordinate processing unit for calculation of horizontal reference plane; and the displaying elements display the Z angles on the current planar factor of the X axis and Y axis (X0°, Y0° indicating the compass mechanism is currently on a horizontal condition). Further, through the imaging device picking up the image of the light beam, together with the Z axis position processing unit determining the displacement condition on the Z axis (Z axis angle being checked with upper and lower vertical focus points of the light beam emitting unit). Afterwards, the X, Y, Z angles are collectively displayed by the integrated data displaying element to allow of logical reading of angles by the compass mechanism in ten dimensions including rotations in eight directions of East, West, South, North, Northeast, Southwest, Southeast, and Northwest and longitude in longitudinal direction of the circular circumference and latitude in transverse direction of the circular circumference.

The present invention is applicable to civil measurement, door panel, architectures, marine constructions, decorations, gifts, sports equipments, scientific coordinates, educational material, or other types of hardware, and is further applicable to disaster forecast, such as river food forecast and collapse forecast of side wall of ground.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
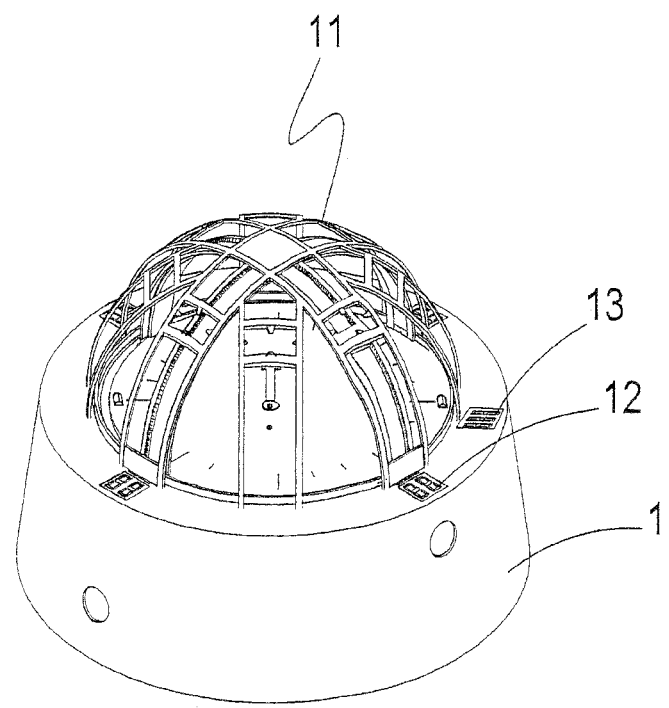
FIG. 1 is a perspective view showing a preferred embodiment according to the present invention.
Figure 2:
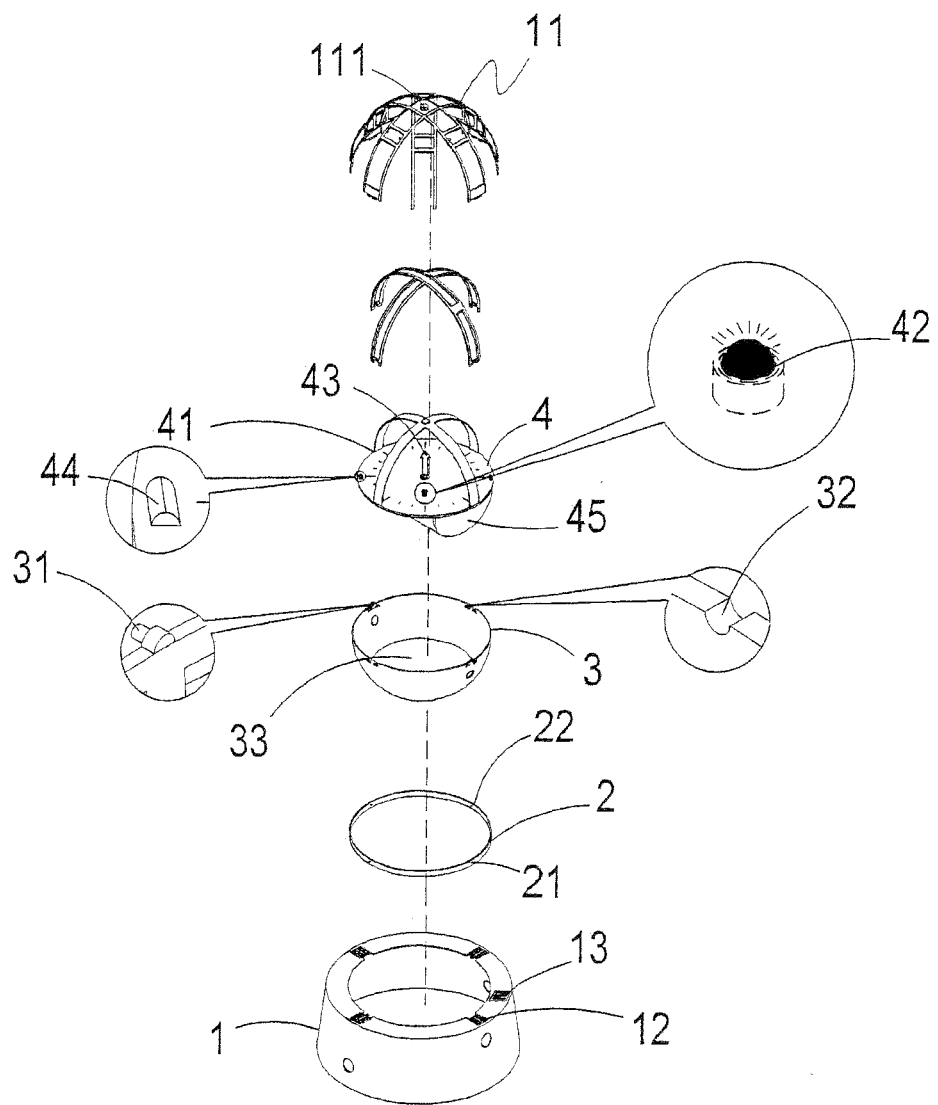
FIG. 2 is an exploded view of the preferred embodiment of the present invention.
Figure 3:
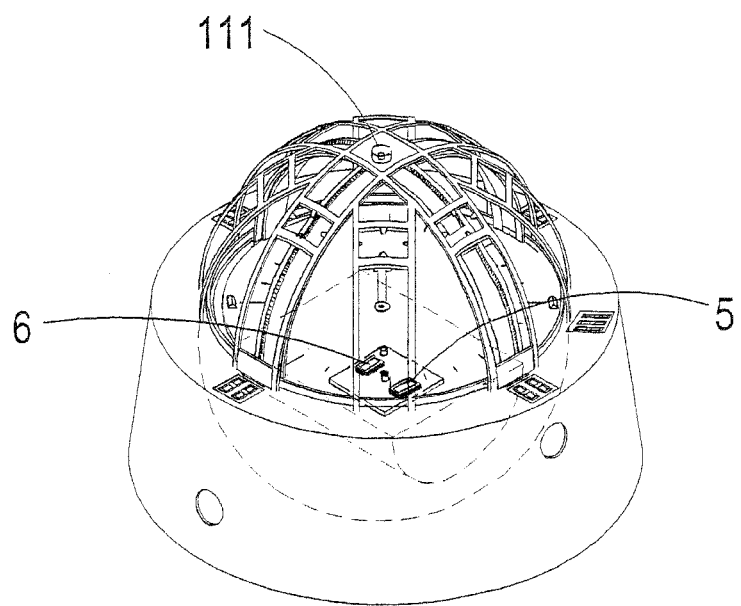
FIG. 3 is a perspective view illustrating use of the preferred embodiment according to the present invention.

Referring to FIGS. 1, 2, and 3, which are respectively a perspective view and an exploded view of a preferred embodiment according to the present invention and a perspective view illustrating use of the present invention, as shown in the drawings, the present invention provides a digital-displaying spectrometer that comprises at least one imaging device mounted at a predetermined location. The digital-displaying spectrometer additionally comprises the following the following components:

A base 1 comprises a frame 11 mounted thereon and the frame 11 carries coordinate scales thereon. The frame 11 carries an imaging device 111 thereon. A plurality of displaying elements 12 are provided at a side wall at a joint between the base 1 and the frame 11 for observing planar factor of (X0°, −X0°) of the X axis and (Y0°, −Y0°) of the Y axis. The displaying elements 12 may further comprise digital displaying devices or spectrum output displaying devices.

A circular ring 2 comprises a first positioning bearing 21 at each of opposite sides of the YY axis direction thereof to pivotally couple to the YY axis direction of the base 1. The circular ring 2 forms a first positioning hole 22 at each of opposite sides of the XX axis direction thereof.

A casing 3 forms a second positioning bearing 31 at each of opposites sides of the XX axis direction thereof to pivotally couple to the first positioning hole 22. The casing 3 forms a second positioning hole 32 at each of opposite sides of the YY axis direction thereof. Further, the casing 3 has a bottom at which a first plummet 33 is arranged.

A compass mechanism 4 forms a third positioning bearing 41 at each of opposite sides the YY axis direction thereof to pivotally couple to the YY axis direction second positioning hole 32 of the casing 3. The compass mechanism 4 comprises a light beam emitting element 42 and a second plummet 45. The compass mechanism 4 is provided with at least one indicator 43 and is further provided with at least one balance displacement block 44.

A coordinate processing unit 5 is in information connection with the displaying elements 12 and the light beam emitting unit 42 in order to calculate each Z0° angle on the horizontal of East, West, South, North and circumference based on the horizontal level of the compass mechanism 4 that are displayed by the displaying elements 12.

A Z axis position processing unit 6 is in information connection with the light beam emitting unit 42.

Further, the base 1 is provided with an integrated data displaying element 13 for displaying inclination angles of X-, Y-, and Z-axis. The integrated data displaying element 13 is in information connection with the coordinate processing unit 5 and the Z axis position processing unit 6.

Figure 4:
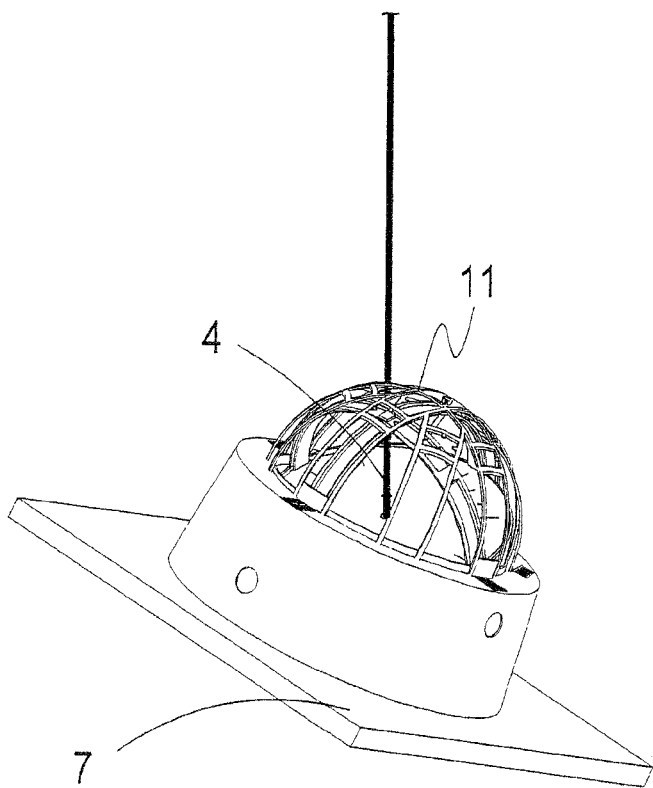
FIG. 4 is a first schematic view illustrating inclination of a compass mechanism on the Z-axis circular circumference according to the present invention.
Figure 5:
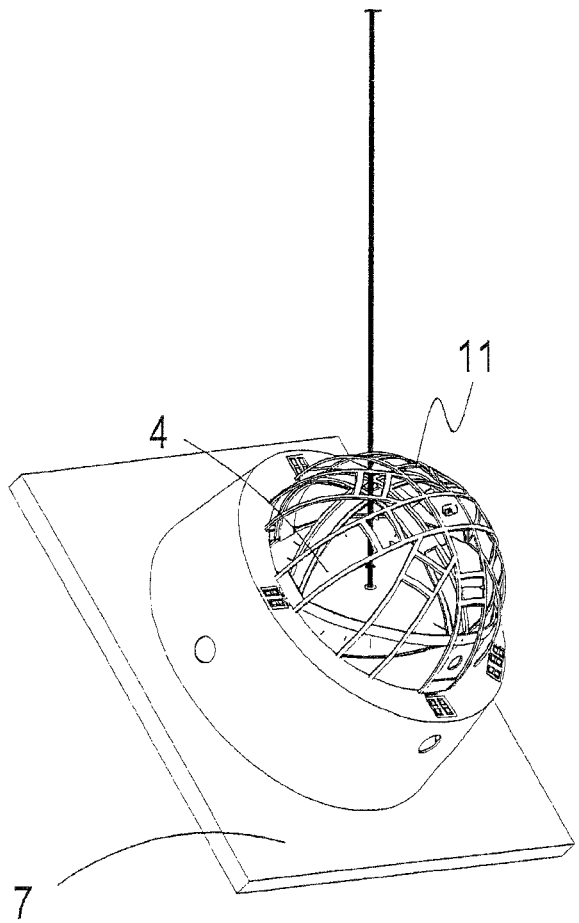
FIG. 5 is a second schematic view illustrating inclination of the compass mechanism on the Z-axis circular circumference according to the present invention.
Figure 6:
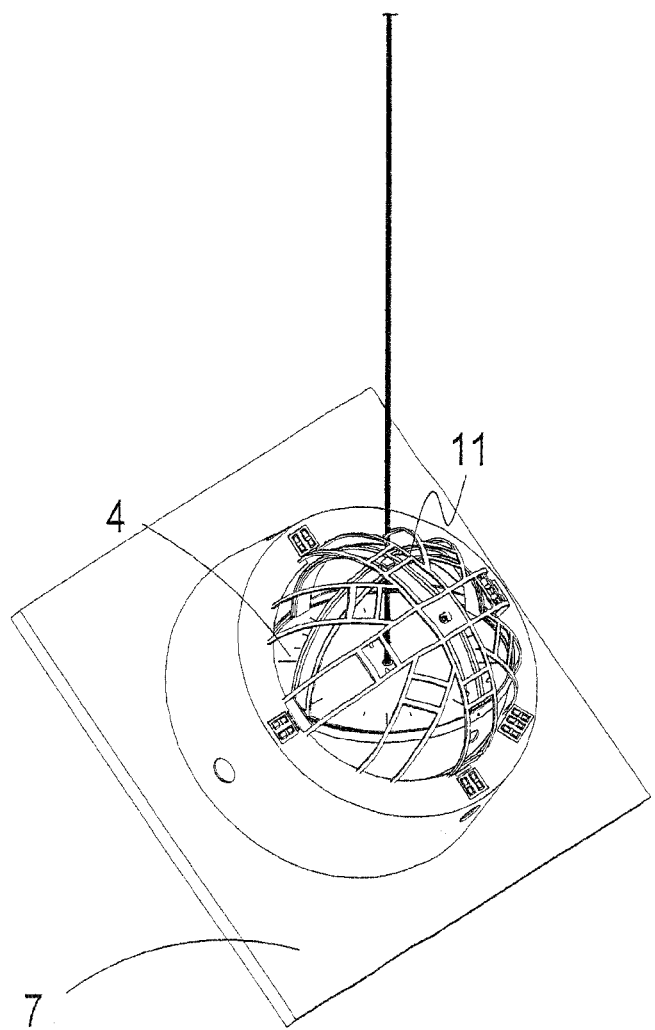
FIG. 6 is a third schematic view illustrating inclination of the compass mechanism on the Z-axis circular circumference according to the present invention.
Figure 7:
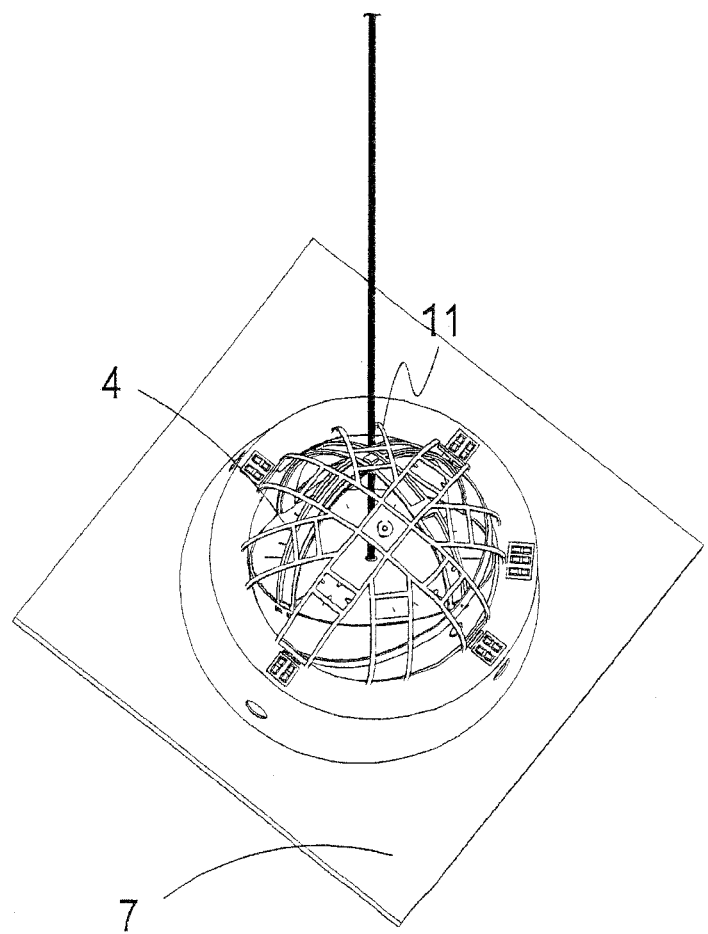
FIG. 7 is a fourth schematic view illustrating inclination of the compass mechanism on the Z-axis circular circumference according to the present invention.
Figure 8:
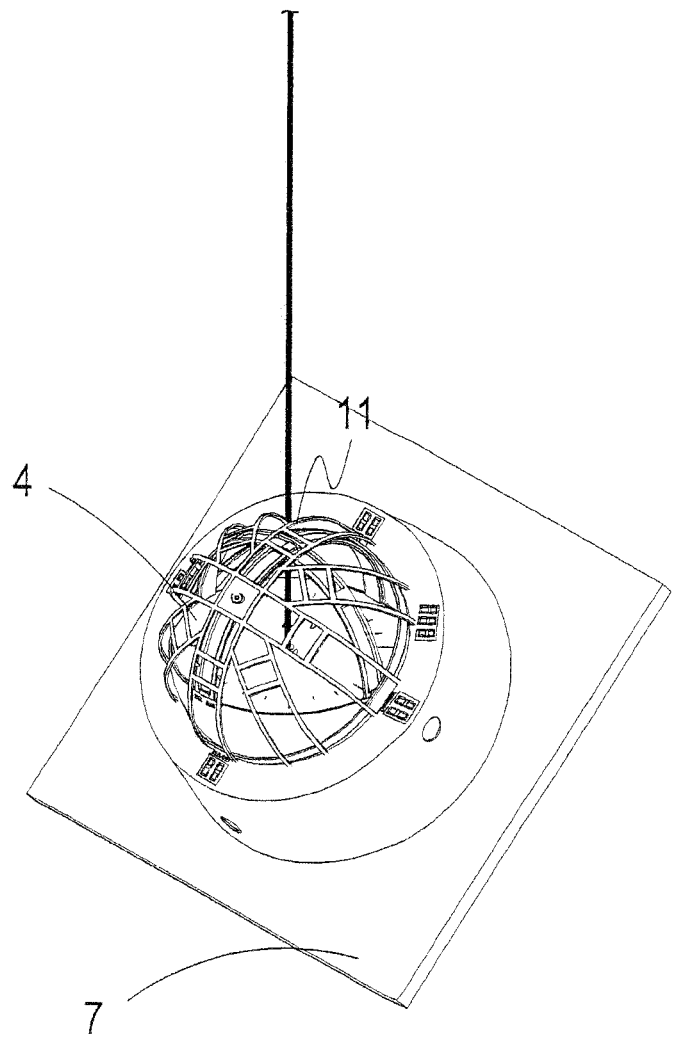
FIG. 8 is a fifth schematic view illustrating inclination of the compass mechanism on the Z-axis circular circumference according to the present invention.
Figure 9:
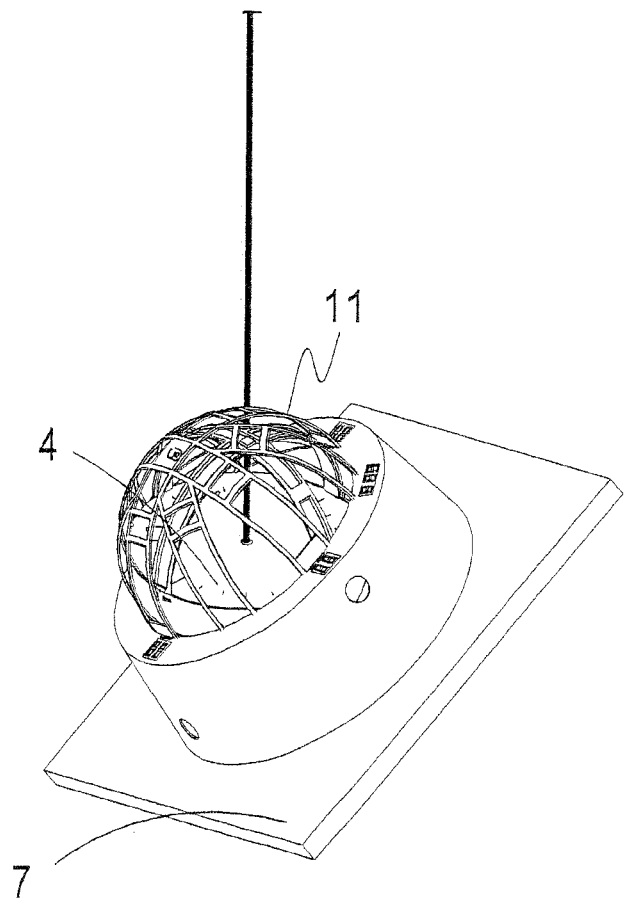
FIG. 9 is a sixth schematic view illustrating inclination of the compass mechanism on the Z-axis circular circumference according to the present invention.
Figure 10:
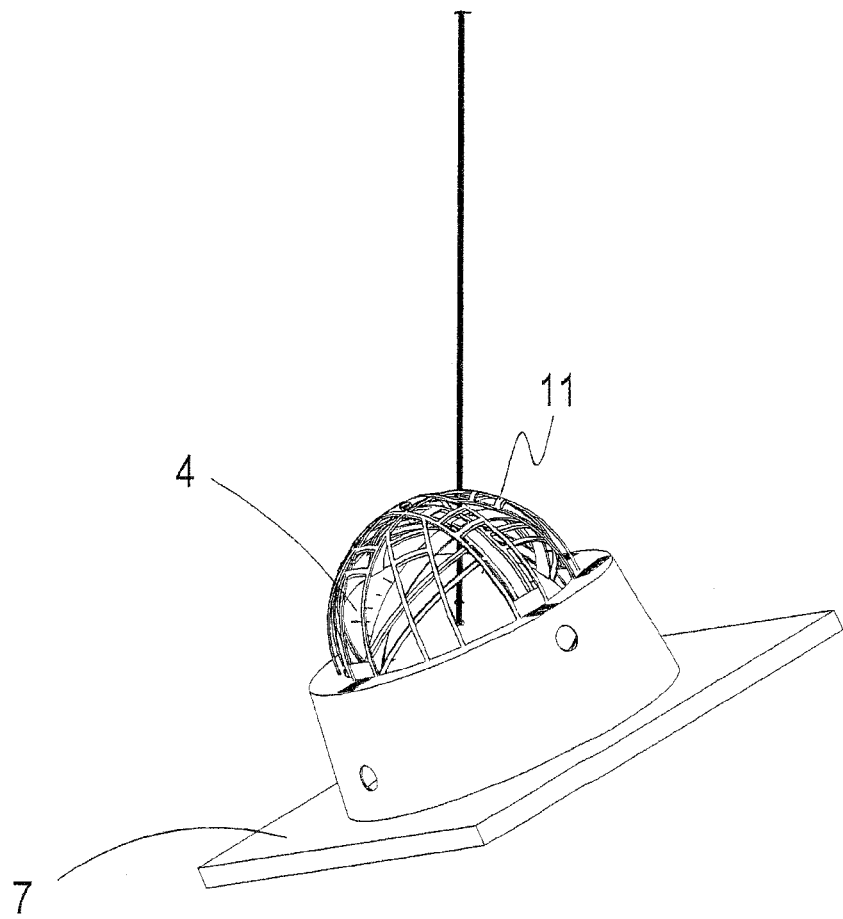
FIG. 10 is a seventh schematic view illustrating inclination of the compass mechanism on the Z-axis circular circumference according to the present invention.
Figure 11:
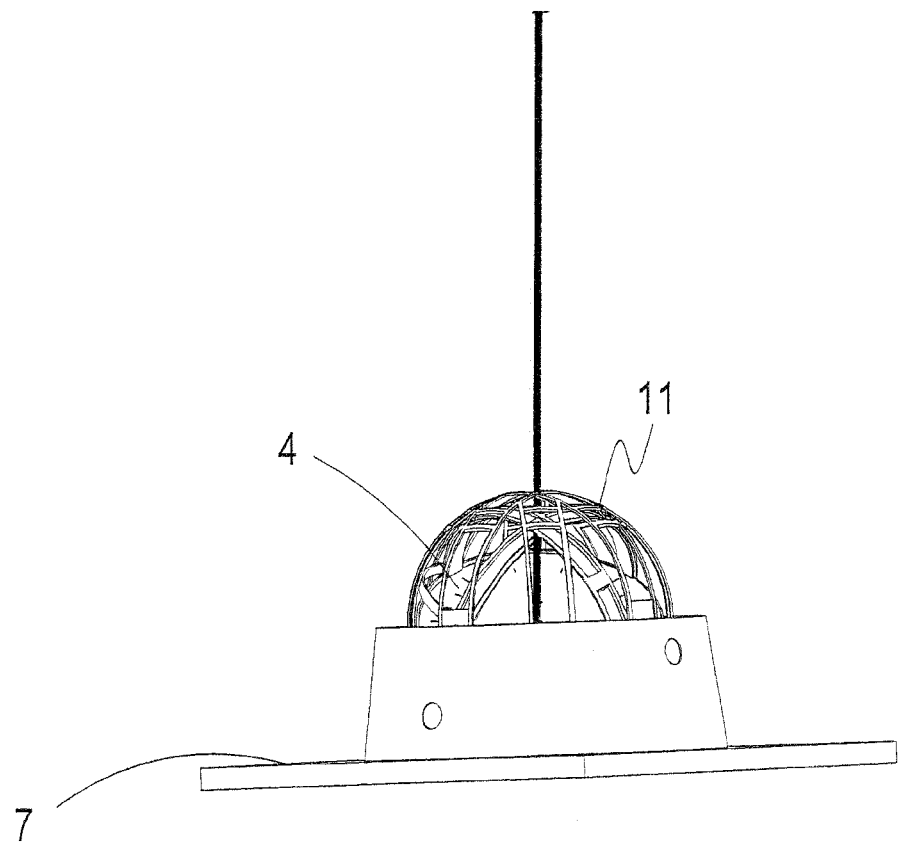
FIG. 11 is an eighth schematic view illustrating inclination of the compass mechanism on the Z-axis circular circumference according to the present invention.

Referring to FIGS. 1-10, which are respectively a perspective view and an exploded view of a preferred embodiment according to the present invention, a perspective view illustrating use of the present invention, and eight schematic views illustrating inclination of the compass mechanism on the Z-axis circular circumference, the drawings clearly show that when the base 1 is attached to the object-to-be-detected 7, the first plummet 33 of the casing 3 and the second plummet 45, due to being acted upon by the gravity, set the compass mechanism 4 in a horizontal balanced condition, and the compass mechanism 4 being set in the horizontal condition is realized through a structure composed of pivotal coupling among the first positioning bearings 21, the first positioning holes 22, the second positioning bearings 31, the second positioning holes 32, and the third positioning bearings 41 that collectively form an omni-directional mechanism. When the object-to-be-detected 7 reaches a horizontal balanced condition, the imaging device 111 is put into operation in cooperation with spectrum emitted from the light beam emitting element 42 and reading of angle of X- and Y-axis of the compass mechanism 4 performed by the coordinate processing unit 5, whereby when the object-to-be-detected 7 reaches the horizontal balanced condition, the imaging device 111 picks up and transmits an image to the coordinate processing unit 5 for performance of calculation and reading of the compass mechanism 4. If it is identified that X- and Y-axis are both 0°, the information is transmitted to the displaying elements 12 to display 0°. The imaging device 111 also picks up and transmits, at the same time, an image to the Z axis position processing unit 6 to determine the Z-axis position. If the reading indicates a match with an internal function of the Z axis position processing unit 6, it is identified that the compass mechanism 4 is on a horizontal balanced point, which is referred to as Z0° on planar factor of X0°, Y0°, Z0°, and the integrated data displaying element 13 displays the readings of the angles of X-, Y-, and Z-axis to allow a user to directly observe and may provide outputs of different directions as desired, and may provide multi-directional outputs of vertical spectrum focus point data (as shown in FIG. 4). If the object-to-be-detected 7 to which the base 1 is attached is not in horizontal balance, under such a condition, the compass mechanism 4 may reaches horizontal balance through the first plummet 33 and the second plummet 45, so that an altitude difference is inducted between the compass mechanism 4 and the base 1. Afterwards, a spectrum is emitted from the light beam emitting element 42 to be detected and imaged by the imaging device 111 and the coordinate processing unit 5 performs reading of the spectrum and determination of the X- and Y-axis angles of the compass mechanism 4 from the relative position of the image. The displaying elements 12 may display the current angles of the X axis and the Y axis. When it is identified through precise reading that the angles of the X axis and the Y axis are determined to be negative, such as negative values of X1°, Y0°, Z0° or negative values of X0°, Y1°, Z0°, under this condition, adjustment for resetting is made through the balance displacement block 44 of the compass mechanism 4 to be set on a desired reference, and checking of Z axis coordinate Z0° to be a desired value (as shown in FIGS. 5-12). This realizes common acceptance of simultaneous ten-dimension XYZ measurement.

Figure 12:
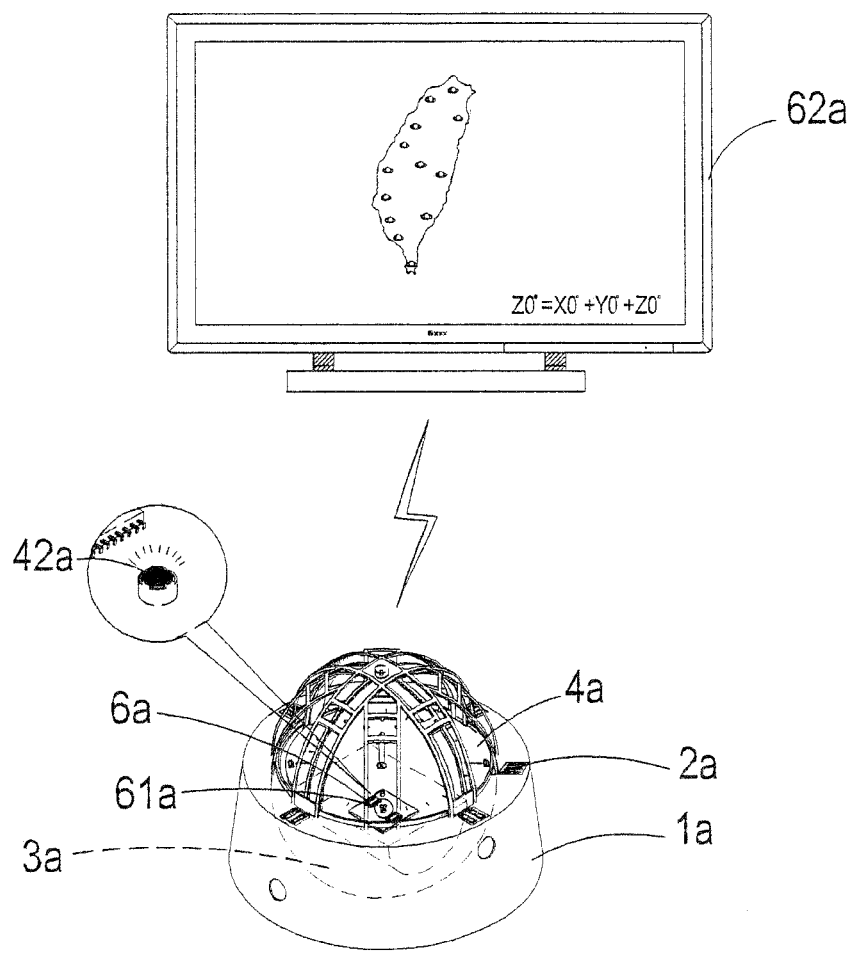
FIG. 12 is a schematic view illustrating a first preferred application of the preferred embodiment according to the present invention.

As shown in FIG. 12, which is a schematic view illustrating a first preferred application of the present invention, the drawing clearly shows that the digital-displaying spectrometer is composed of a base 1a, a circular ring 2a pivotally coupled to the base 1a, a casing 3a pivotally coupled to the circular ring 2a, a compass mechanism 4a pivotally coupled to the casing 3a, and a Z axis position processing unit 6a that is in information connection with a light beam emitting element 42a that is arranged in the compass mechanism 4a. The Z axis position processing unit 6a is further in information connection with an alarm issuing element 61a. The alarm issuing element 61a is in information connection with a computer display 62a (normally being in Z0 degree=X0°, Y0°,Z0°, to serve as a disaster forecast system. When the site where the base 1a is located inclines and is shown on the planar factor of the compass mechanism 4a, and the Z axis position processing unit 6a identifies the inclination of the Z0° angle on the planar factor of the X axis and the Y axis (such as Z5°=X0°, Y0°, Z5°, indicating the object monitored through the computer display 62a inclines by 5°), whereby the alarm issuing element 61a issues an alarm message and the computer display 62a displays the site where the disaster occurs to thereby realizing forecast of disaster.

Figure 13:
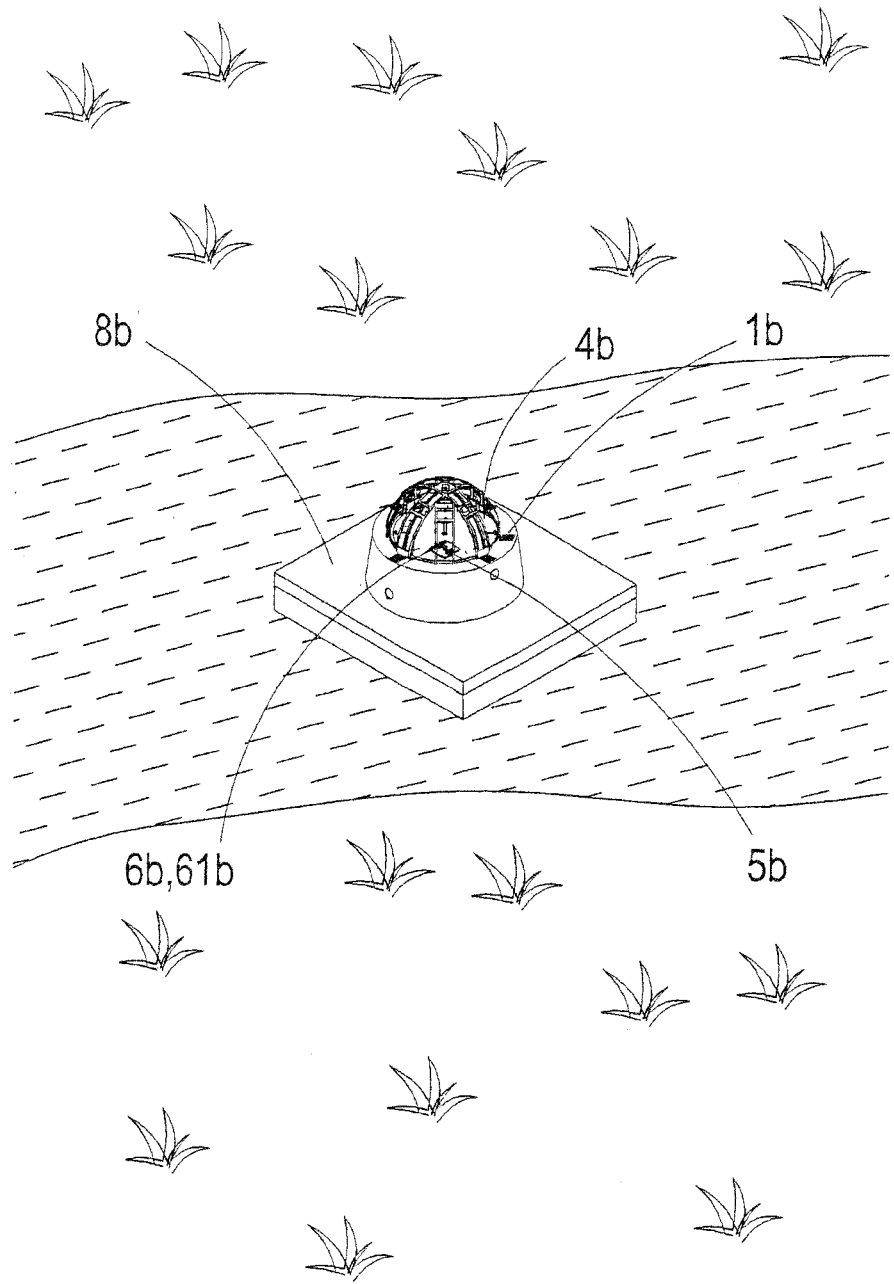
FIG. 13 is a schematic view illustrating a second preferred application of the preferred embodiment according to the present invention.

Referring to FIG. 13, which is a schematic view illustrating a second preferred application of the present invention, the drawing clearly shows that the base 1b is mounted on a float 8b for monitoring water level of flowing river water. When the flow rate of the river becomes surging and rushing, the compass mechanism 4b get inclined due to being rushed by the water stream, whereby the coordinate processing unit 5b and the Z axis position processing unit 6b show negative readings of angle, indicating the flow rate of the river significantly increases and rushes. The alarm issuing element 61b may issue a message as a notification of the river being current dangerous water area and entrance is prohibited. As such, prevention of disaster and alarming can be realized.

Figure 14:
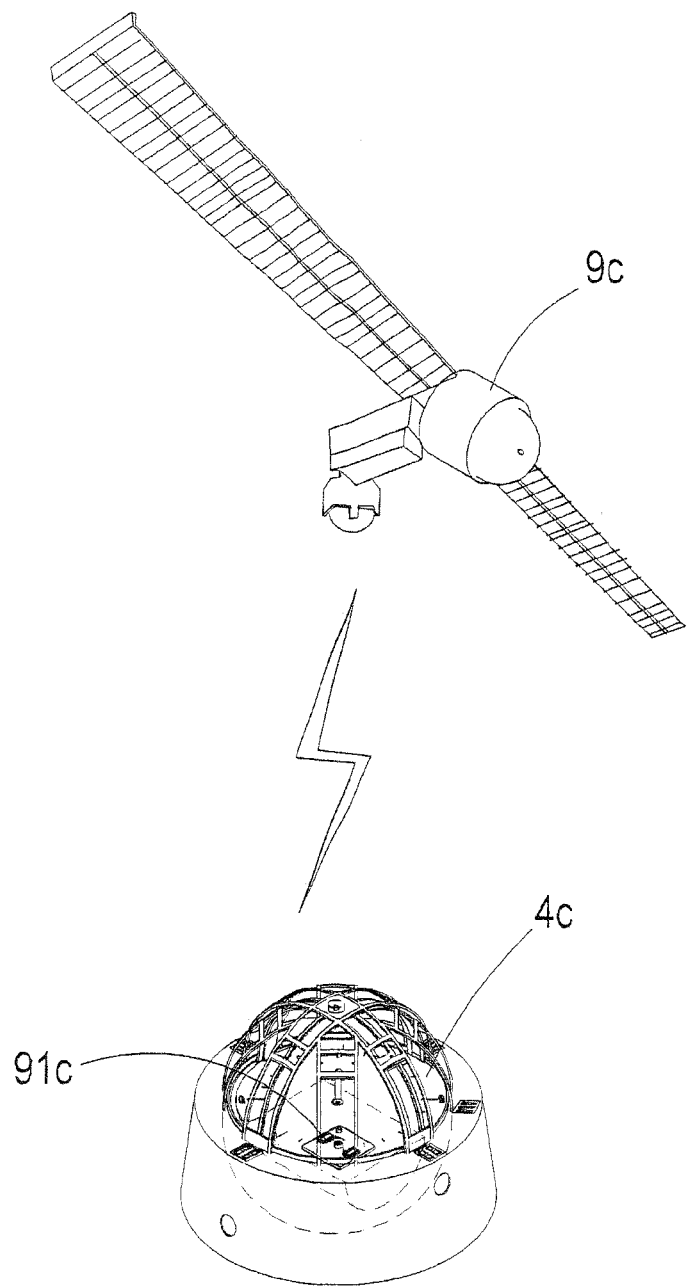
FIG. 14 is a schematic view illustrating a third preferred application of the preferred embodiment according to the present invention.

Referring to FIG. 14, which is a schematic view illustrating a third preferred application of the present invention, the drawing clearly shows that the digital-displaying spectrometer is in information connection with longitude/latitude zone of a satellite (of which the embodiment is a satellite 9c, but it not limited thereto) to provide Z-axis coordinate Z0° of each direction of the compass mechanism for determination of checking digital displaying of longitude/latitude Z0°. Further, the digital-displaying spectrometer and the satellite 9c are respectively provided with the information processing units 91c for realizing information connection therebetween. As such, when the compass mechanism 4c of the digital-displaying spectrometer reaches a horizontal balanced condition, the information processing unit 91c determines if the Z-axis direction data match data of the information processing unit 91c of the satellite 9c to obtain precise level reference and thus realize the dynamic measurement of inclination of the coordinates with respect to the object or static observation of the coordinates with respect to the theodolite.

Figure 15:
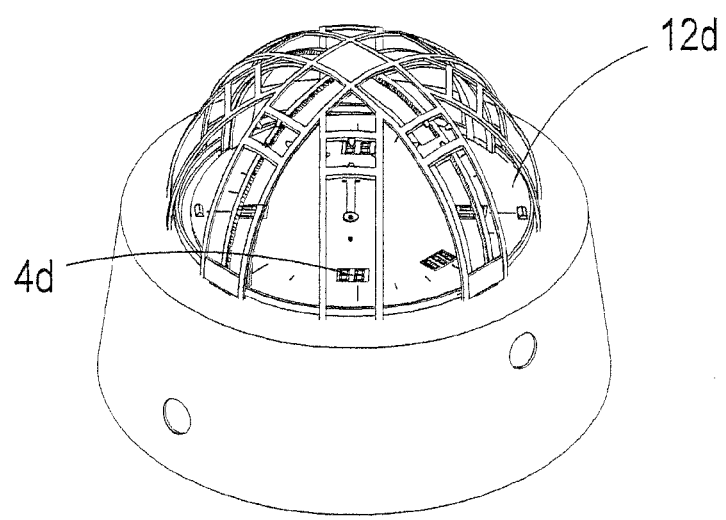
FIG. 15 is a schematic view illustrating a fourth preferred application of the preferred embodiment according to the present invention.

Referring to FIG. 15, which is a schematic view illustrating a fourth preferred application of the present invention, the drawing clearly shows that the compass mechanism 4d is further provided with a number of displaying elements 12d, whereby the displaying elements 12d may display planar factor of (X0°, −X0°) of the X axis and (Y0°−Y0°) of the Y axis.

In summary, the present invention has the following advantages:

(1) The present invention provides a ten-dimension digital-displaying spectrometer that can be directly positioned on an object-to-be-detected 7 for detecting XYZ reference parameters, including vertical, horizontal, and angles so as to simplify the operation and eliminate undesired limitations.

(2) Applications can be made to detection of horizontal for industries by being of effective use in horizontal and angular processes for lathes, presses, punching machines, and jigs, for manufactured upper and lower parts require point engagement, abrading engagement, pressing engagement, punching engagement that relies upon horizontal reference to manufacture precise product, otherwise false products may be made.

(3) Applications can be made to positioning and observation/monitoring to effectively realize positioning monitoring for poor terrains, such as XYZ coordinates of buildings, dam gates, slopes, to enhance prevention of loss of soil and water and understanding of earthquakes and other disasters for they can be identified through XYZ coordinates, whereby prevention can be realized.

(4) Applications can be made to XYZ ten-dimension devices of high-level machines, such as land, marine, and aviation navigation, for example observation of airplane body coordinates and motor engine seat coordinates, positioning of wheels, cannon instruments, gun instruments, projection navigation, cartography instruments, laser instruments, boarder measurement, imaging instruments, distance measurement, altitude measurement, compass of direction, XYZ coordinates of medical instruments, XYZ observation of astronomical observatory, and further evolved into the present invention for more extensive improvement as an earthquake ten-dimensional coordinates of longitude and latitudes coupled to cartography instruments for more scientific study.

(5) The longitude/latitude ten-dimension XYZ digital-displaying spectrometer can be used to detect logic ten-dimensional parameters, including Z angle on the planar factor of X0°, Y0° in the eight directional orbits of East (E), West (W), South (S), North (N), Northeast (EN), Southwest (WS), Southeast (ES), and Northwest (WN) and longitudes in the longitudinal direction of a circular circumference of the eight directions and the latitudes in the transverse direction of the circular circumference.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A longitude/latitude ten-dimension XYZ digital-displaying spectrometer, comprising:
   a base, which comprises a frame mounted thereon, a plurality of displaying elements being are provided at a side wall at a joint between the base and the frame for planar factor of X axis and Y axis;
   a circular ring, which comprises a first positioning bearing at each of opposite sides of YY axis direction thereof to pivotally couple to YY axis direction of the base, the circular ring forming a first positioning hole at each of opposite sides of XX axis direction thereof;
   a casing, which forms a second positioning bearing at each of opposites sides of XX axis direction thereof to pivotally couple to the first positioning hole, the casing forming a second positioning hole at each of opposite sides of YY axis direction thereof, the casing having a bottom at which a first plummet is arranged;
   a compass mechanism, which forms a third positioning bearing at each of opposite sides the YY axis direction thereof to pivotally couple to the YY axis direction second positioning hole of the casing, the compass mechanism comprising a light beam emitting element and a second plummet;
   a coordinate processing unit, which is in information connection with the displaying elements and the light beam emitting unit in order to calculate horizontal level of the compass mechanism that is displayed by the displaying elements; and
   a Z axis position processing unit, which is in information connection with the light beam emitting unit.

2. The longitude/latitude ten-dimension XYZ digital-displaying spectrometer according to claim 1, wherein the digital-displaying spectrometer comprises at least one imaging device arranged at a predetermined location.

3. The longitude/latitude ten-dimension XYZ digital-displaying spectrometer according to claim 1, wherein the frame forms coordinate scales thereon.

4. The longitude/latitude ten-dimension XYZ digital-displaying spectrometer according to claim 1, wherein the compass mechanism is provided with at least one indicator.

5. The longitude/latitude ten-dimension XYZ digital-displaying spectrometer according to claim 1, wherein the compass mechanism is provided with at least one balance displacement block.

6. The longitude/latitude ten-dimension XYZ digital-displaying spectrometer according to claim 1, wherein the displaying elements comprise digital displaying devices or spectrum output displaying devices.

7. The longitude/latitude ten-dimension XYZ digital-displaying spectrometer according to claim 1, wherein the Z axis position processing unit is in information connection with an alarm issuing element, the alarm issuing element being in information connection with a computer display to serve as a disaster forecast system.

8. The longitude/latitude ten-dimension XYZ digital-displaying spectrometer according to claim 1, wherein the base is mounted on a float for monitoring water level of flowing river water.

9. The longitude/latitude ten-dimension XYZ digital-displaying spectrometer according to claim 1, wherein the digital-displaying spectrometer is in information connection with a satellite to provide Z-axis coordinate Z0° of each direction of the compass mechanism for determination of checking digital displaying of longitude/latitude Z0°.

10. The longitude/latitude ten-dimension XYZ digital-displaying spectrometer according to claim 1, wherein the base is provided with an integrated data displaying element for displaying inclination angles of X-, Y-, and Z-axis, the integrated data displaying element being in information connection with the coordinate processing unit and the Z axis position processing unit.

11. The longitude/latitude ten-dimension XYZ digital-displaying spectrometer according to claim 1, wherein the compass mechanism is provided with a number of displaying elements.

* * * * *